US005524576A

United States Patent [19]

Walther

[11] Patent Number: 5,524,576

[45] Date of Patent: Jun. 11, 1996

[54] ANIMAL ORAL FEEDING/INJECTING DEVICE

[76] Inventor: Dale D. Walther, 213 S. Belmore St., Leipsic, Ohio 45856

[21] Appl. No.: 330,860

[22] Filed: Oct. 31, 1994

[51] Int. Cl.$^{6}$ .......... A01K 5/00

[52] U.S. Cl. .......... 119/51.01; 604/208; 433/90

[58] Field of Search .......... 433/90; 119/51.01; 604/181, 186, 187, 207, 208

[56] References Cited

U.S. PATENT DOCUMENTS

| | | | |
|---|---|---|---|
| 2,505,028 | 4/1950 | Boeger | 433/90 |
| 3,598,120 | 8/1971 | Mass | 604/208 |
| 3,749,284 | 7/1973 | Kloehn | 604/208 X |
| 4,813,871 | 3/1989 | Friedman | 433/90 |
| 4,973,248 | 11/1990 | Sigler | 433/90 |
| 5,033,650 | 7/1991 | Colin et al. | 433/90 X |
| 5,053,022 | 10/1991 | Bryant et al. | 119/51.01 X |

*Primary Examiner*—Thomas Price
*Attorney, Agent, or Firm*—George A. Bode; Michael L. Hoelter

[57] ABSTRACT

An animal feeding or injecting device for orally supplying liquids, slurries, gels, and some solids to an animal. This device consists of a tubular container having a tapered end region and an opposite open end through which a plunger passes. A stop or collar is slidable along the outside of the tubular container which not only restricts the distance the plunger can be inserted within the tubular container, but also prevents the tubular container from being inserted too far within the animal's mouth. A connector is secured to both the stop and the plunger so as to prevent the plunger from being inserted too far within the tubular container.

11 Claims, 4 Drawing Sheets

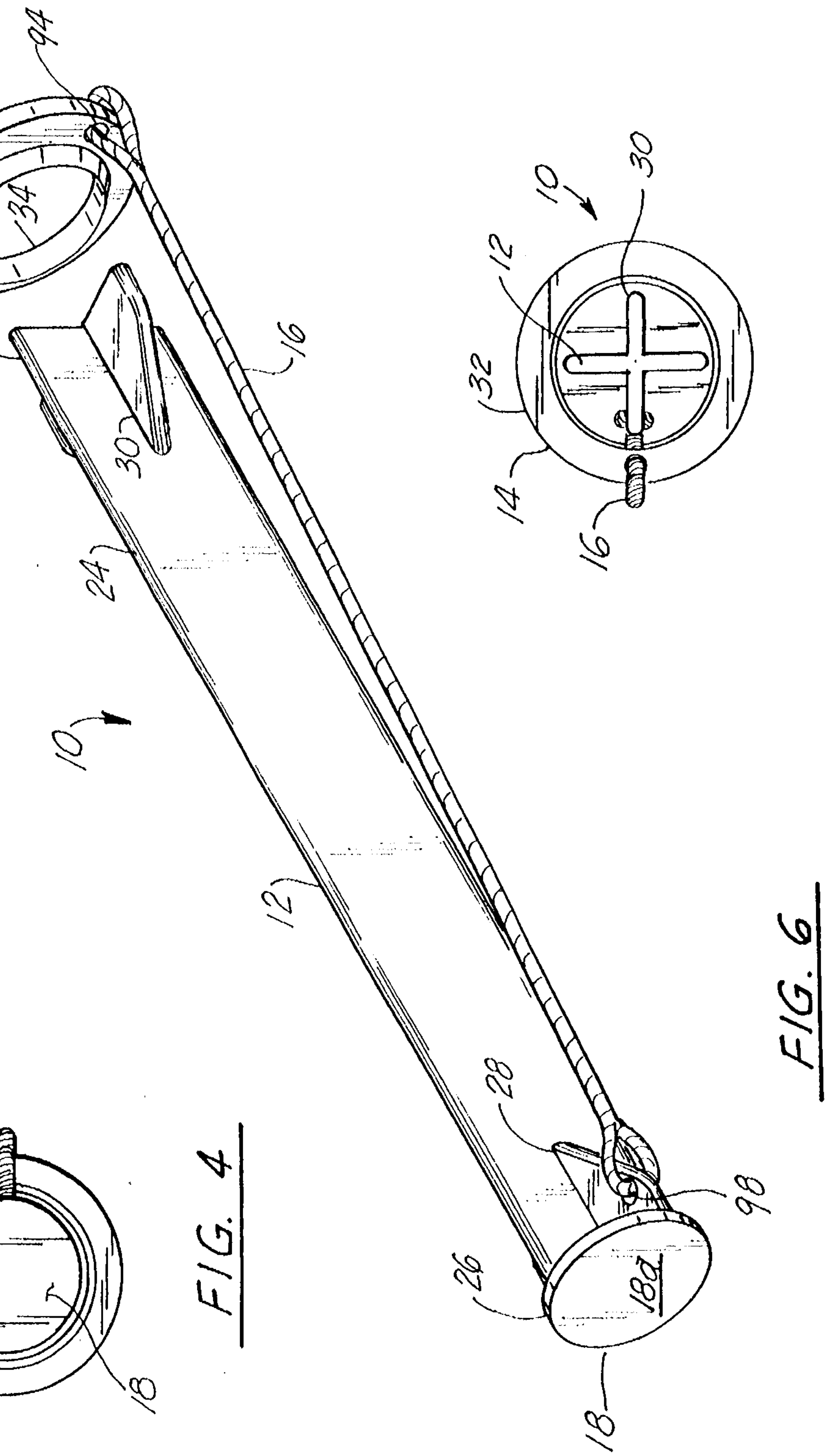
FIG. 6
FIG. 5
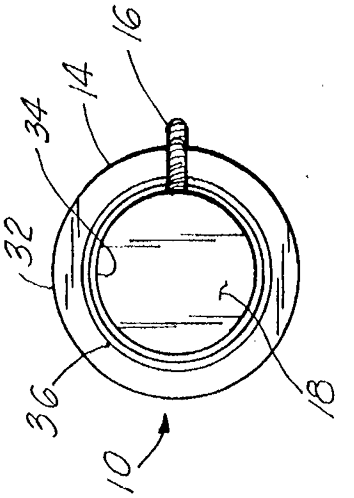
FIG. 4

ANIMAL ORAL FEEDING/INJECTING DEVICE

BACKGROUND OF THE INVENTION

1. Field of the Invention

This invention generally pertains to feeding/injection devices for use on animals and more particularly to an oral injection device that introduces or delivers fluids, slurries, solids or gels into an animal's mouth.

2. General Background

Many devices exist that assist a veterinarian, rancher, farmer, or other animal owner in injecting a fluid, solid or gel into an animal's mouth. Probably the most common device used is a syringe which is configured with a tubular container that tapers to a narrow distal opening and a plunger that forces the material out of the narrow distal opening. While such a device is well known, it has certain drawbacks in that it is not always re-usable and it is possible for the syringe to be placed too far back inside the animals' mouth such that the animal will involuntarily gag or choke. This is to be avoided since the material to be injected is not to be inhaled by the animal into its lungs, but instead is to be swallowed by the animal for delivery to its stomach. Such material may be vitamins, minerals or medication.

It is thus an object of this invention to provide an injecting device for use on animals, and more particularly large animals.

It is another object of this invention to provide a device which is re-usable.

Another object of this invention is to incorporate a stop so that the device is not inserted too far into the animal's mouth.

Yet another object of this invention is to provide a means of adjusting this stop for different sized animals.

Still another object of this invention is to provide a means of coupling the tubular container with the plunger such that the two will stay connected.

A further object of this invention is to provide a means of restricting or limiting the movement of the plunger within the tubular container as desired. These and other objects and advantages of this invention will become obvious upon further investigation.

SUMMARY OF THE PRESENT INVENTION

The preferred embodiment of the apparatus of the present invention solves the aforementioned problems in a straightforward and simple manner. What is disclosed is an animal feeding/injection device that is designed for insertion within the animal's mouth so as to deliver liquids, slurries, gels, and some solids to the animal. This device consists of an elongated tubular container which has a first or proximate open end and an opposite or distal tapering end, this opposite tapering end tapers to an opening smaller than the opening in the first open end and generally terminates at a nipple which may or may not be removable. An elongated plunger is configured with a working or distal end that is sized to fit within the first open end of the tubular container and also to seal against the inside wall of said tubular container. The plunger is further configured with an opposite or proximate hand-held end for use by the user when pushing the working end along and within the tubular container. A stop assembly or collar is slidable along the outside surface of the tubular container and can both limit the distance the tubular container can be inserted within the animal's mouth and also restrict the distance the plunger can be pushed within the tubular container. Finally, this device incorporates a connector that connects the stop assembly to the plunger in order to restrict the distance the plunger can travel with respect to the tubular container.

BRIEF DESCRIPTION OF THE DRAWING

For a further understanding of the nature and objects of the present invention, reference should be had to the following description taken in conjunction with the accompanying drawing in which like parts are given like reference numerals and, wherein:

FIG. 4 is a front elevational view illustrating both the plunger, stopper and connector of the embodiment of FIG. 1;

FIG. 5 is a rear elevational view illustrating both the plunger, stopper and connector of the embodiment of FIG. 1;

FIG. 6 is a top, frontal and left side perspective view illustrating the connection between the plunger, stopper and connector of the embodiment of FIG. 1;

DETAILED DESCRIPTION OF THE PREFERRED EMBODIMENT

Figure 2:
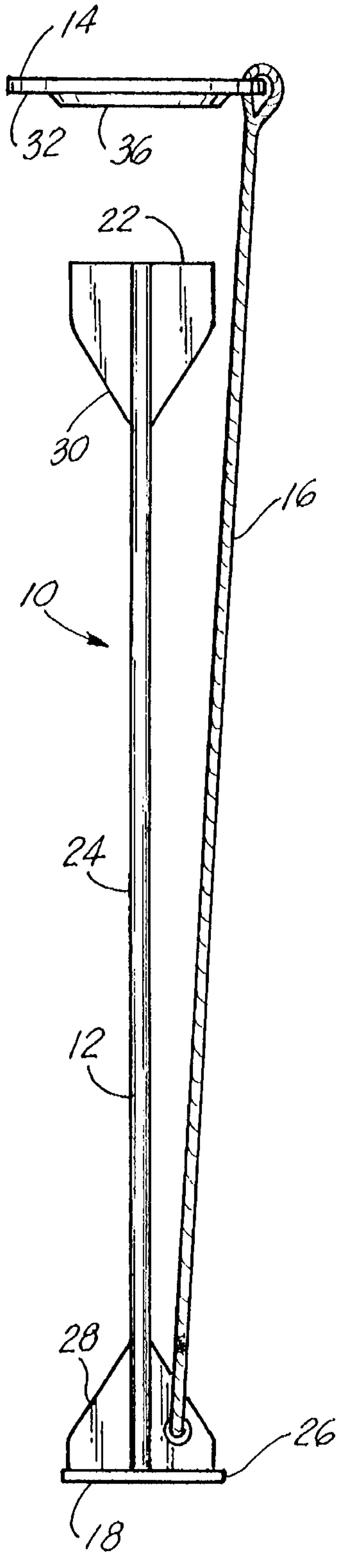
FIG. 2 is a left side elevational view illustrating the connection between the plunger, stopper and connector of the embodiment of FIG. 1.
Figure 1:
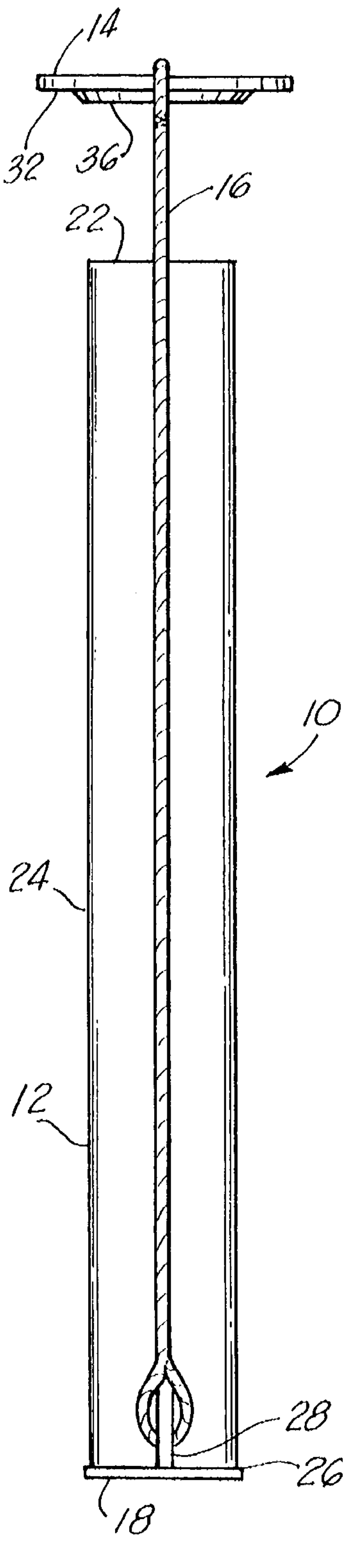
FIG. 1 is a top plan view illustrating the connection between the plunger, stopper and connector of the preferred embodiment of the present invention.
Figure 3:
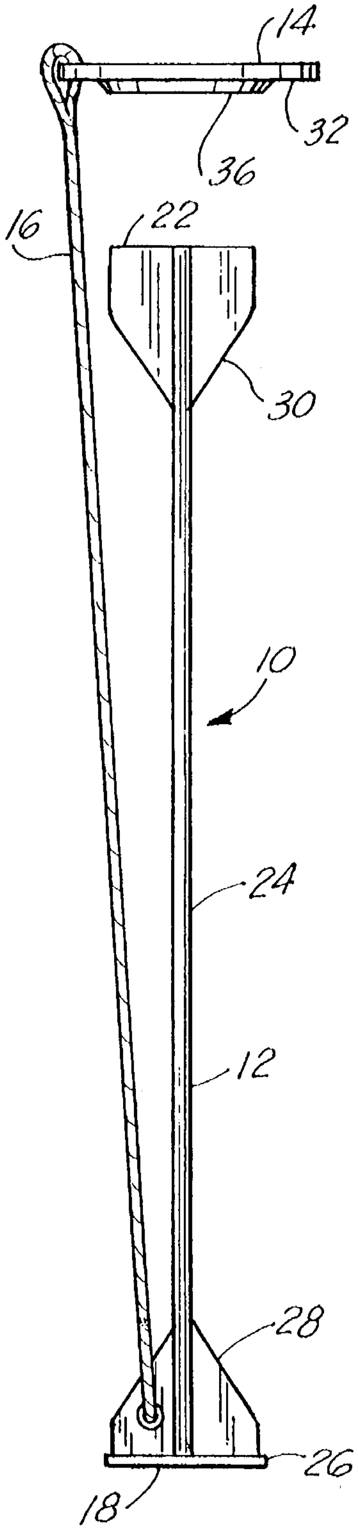
FIG. 3 is a right side elevational view illustrating the connection between the plunger, stopper and connector of the embodiment of FIG. 1.
Figure 7:
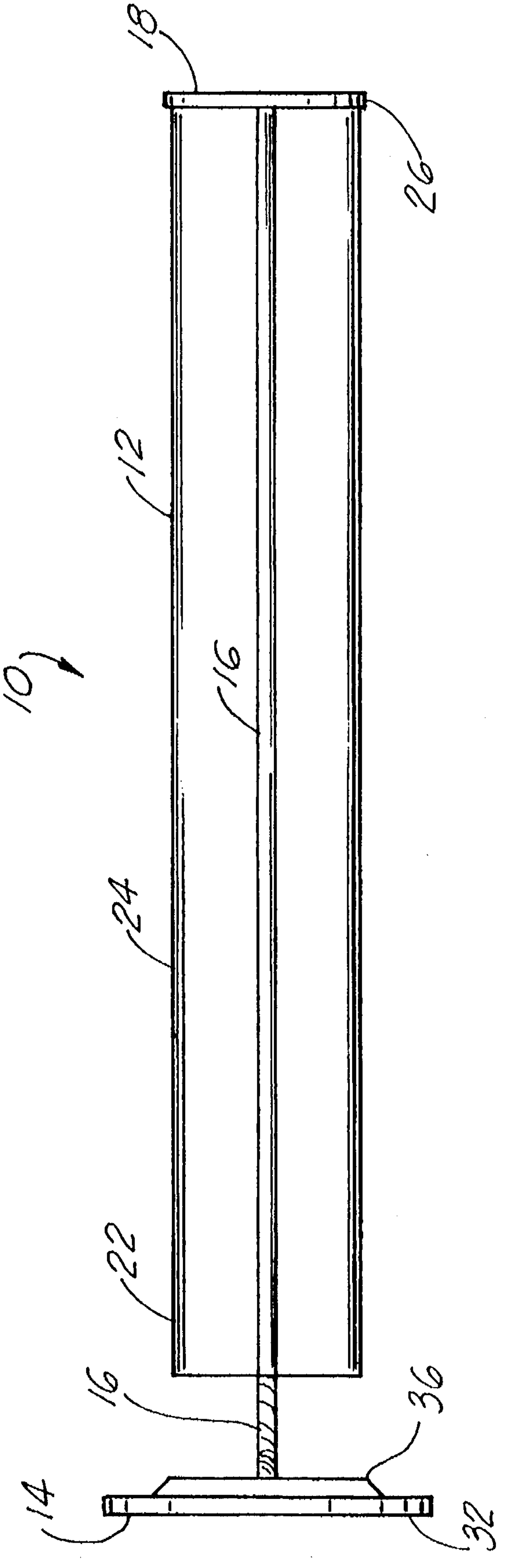
FIG. 7 is a bottom plan view illustrating the plunger, stopper and connector of the embodiment of FIG. 1.

Referring now to FIGS. 1–7, there is shown feeding/injecting device 10 which primarily consists of plunger 12, stop or annular collar 14 and a connector or cord 16 therebetween. Plunger 12 is an elongated generally flat member as shown with a working or distal or first end region 18 having a piston **18*a* sized to fit within tubular container 20 (best seen in FIG. 8) and an opposite or proximate or second end region 22 configured for grasping and pushing by the user. This opposite or hand-held region 22 can be configured many different ways depending upon the users' comfort and desires. Additionally, working end or first end region 18 is usually a flat faced piston 18*a*** as shown, but it can also be made curved or convex or any other shape if so desired.

Plunger 12 is preferably made of a nylon or other plastic material, such as a food grade plastic, but it can also be manufactured of other materials such as aluminum or another metal, hard rubber, or the like. Also, in this embodiment, plunger 12 is constructed with a central plate-like or bar member 24 between end regions 18 and 22. In other embodiments, this member 24 may consist of two intersecting plate-like members (e.g. a cross), or it may be a round, square, oval, rectangular, or other shaped member. In any event, member 24 must be strong enough to transfer the force applied by the user from hand-held region 22 to working end region 18 without buckling, thereby causing this working end region 18 and, therefore, piston 18*a* to slide within tubular container 20.

Piston 18*a* of first or working end region 18 is configured to seal against the inside wall or surface of tubular container 20. To accomplish this, a seal 26 may be secured to the perimeter of piston 18*a* of first end region 18. Usually, this seal 26 will be a unitary part of first end region and will be constructed of the same material thereof. However, in other embodiments, seal 26 can be removable and replaceable if need be and thus can also be constructed of a different material such as a rubber O-ring. Furthermore, first end region 18 is generally configured with braces 28 on the back side thereof to help retain the shape (and thus the seal) of first end region 18. Likewise, braces 30 can be incorporated into second or hand-held region 22 to insure the rigidity of this region when under pressure.

In FIGS. 1–9, connector 16 is illustrated as being a length of cord secured at one end to one brace 28 adjacent working end 18 and secured at the other end to stop or collar 14 (one method of connection is, as seen in FIGS. 1–7, by placing apertures 98, 94 in brace 28 and collar 14, respectively, and tying the ends of connector 16 through each aperture). It should be noted that connector 16 is generally secured adjacent first end region 18 of plunger 12 and not second end region 22 of plunger 12. Thus, it can be said that connector 16 is generally secured adjacent working end 18 of plunger 16 and not adjacent hand-held end 22 of plunger 12. This connector 16 is typically constructed of a nylon cord, but any other type of cord can also suffice. Connector 16 aids in retaining plunger 12 with respect to stop 14 and more importantly with respect to tubular container 20.

Stop or annular collar 14 is shown as comprising an annular ring 32 around central opening 34. Opening or aperture 34 of stop 14 is sized so that stop 14 can snugly fit around the outside of tubular container 20. In the embodiment shown in the drawing FIGURES, stop 14 is also configured with an offset inner circumference 36 (the same dimensions as opening 34) adjacent opening 34 to aid in the relocation of stop 14. As stated above, connector 16 is secured to ring 32 in the typical manner.

Figure 8:
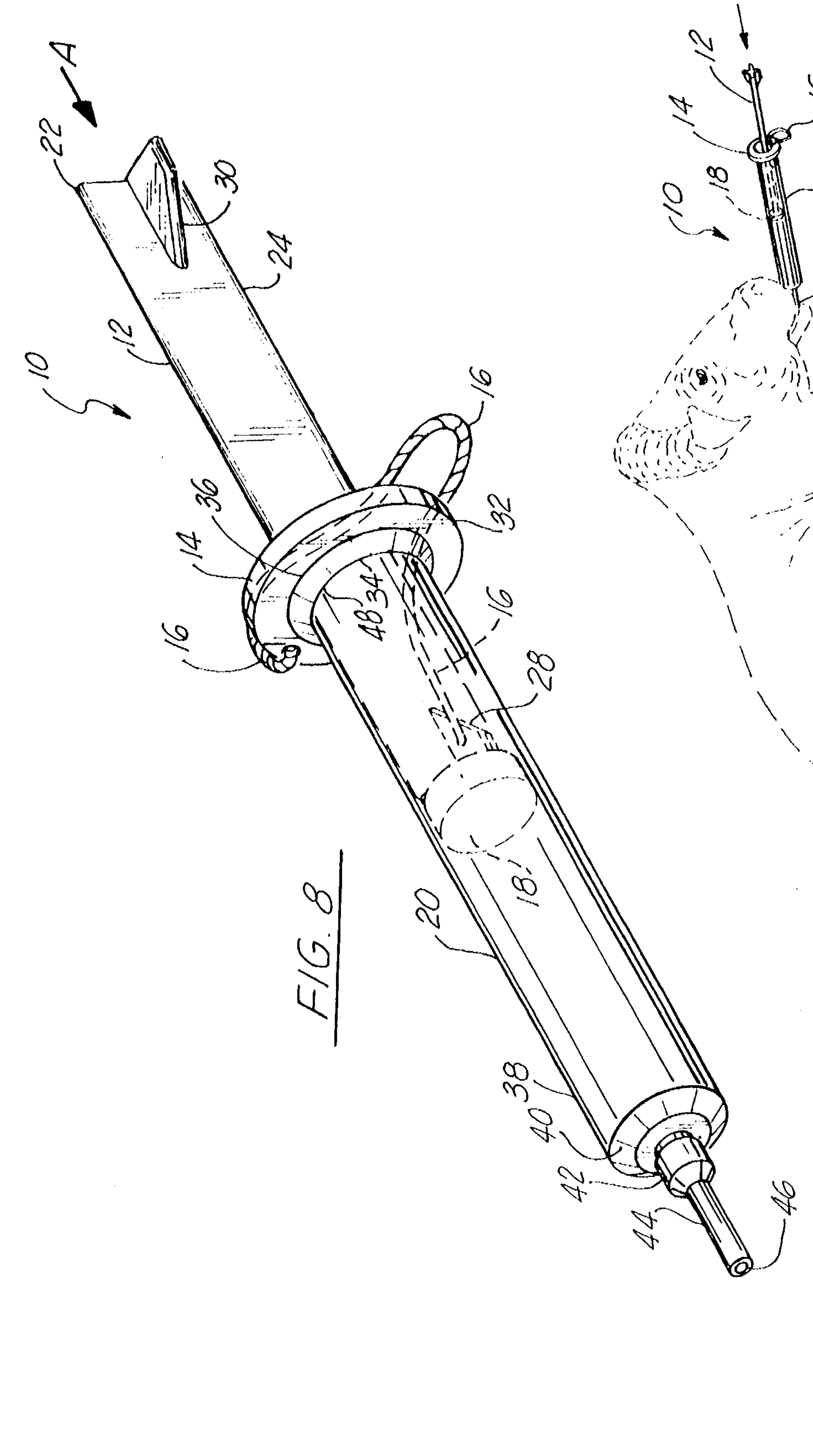
FIG. 8 is a pictorial view of the preferred embodiment of the present invention illustrating its operation; and, FIG. 9 is a pictorial view of the invention illustrating its use on an animal.
Figure 9:
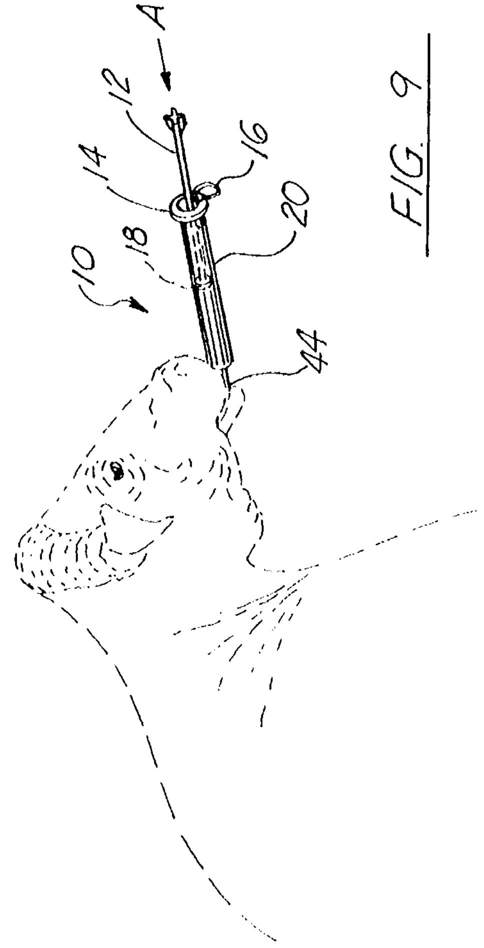

It is desirable for stop 14 to tightly fit against tubular container 20 (as best seen in FIGS. 8 and 9) so that stop 14 will only slide around tubular container 20 after a certain level of friction or resistance is overcome. This is so that once stop 14 is placed along tubular container 20, stop 14 will not move again unless considerable force is re-applied. While it is desirable for stop 14 to be movable or slidable along tubular container 20, it is also desirable for stop 14 to remain in place on container 20 once properly positioned thereon. Raised or offset inner circumference 36 can be designed to aid or assist in this effort.

Stop 14 is also generally constructed of the same material as tubular container 20 so that the two do not slide too easily against one another. However, stop 14 can also be made of another material that has a greater or lesser coefficient of friction with respect to the material of tubular container 20.

Referring now to FIGS. 8 and 9, the assembly of feeding/injecting device 10 is shown. As indicated, working or distal or first end region 18 of plunger 12 is inserted within the first or proximate open end of tubular container 20 with seal 26 sealing between piston 18*a* of this working end 18 and the inside surface or wall of tubular container 20. Consequently, as the user pushes on hand-held region 22 in the direction of ARROW A, working end 18 moves along tubular container 20 in the direction of ARROW A. The user may either move working end 18 closer to or farther away from discharge end 38 of tubular container 20.

Discharge or distal end 38 is generally tapered 40 or smaller in diameter than that of the length of tubular container 20. Discharge end 38 also incorporates a nipple 42 that may either be permanently attached to discharge end 38 may be removable from discharge end 38 such as by threads or a friction fit. Nipple 42 also generally incorporates a short length of tubing 44 through which the substance within tubular container 20 is pushed (in the direction of ARROW A) by working end 18 of plunger 12. The length of this tubing 44 as well as the size of its exit opening 46 can vary depending upon the animal being administered and the material being injected. Obviously, a more viscous material such as thick pastes, gels, or solids will require a larger exit opening 46 than less viscous liquids or thin slurries/gels.

Tubular container 20 is filled with the desired material via fill end or proximate end 48. This fill end 48 contains an opening that is generally the same size as the inner surface of tubular container 20 such that there is no or little variation in the inside diameter of container 20 along this portion of its length. Working end 18 of plunger is then inserted through fill end 48 and pushed inwardly in the direction of ARROW A until it engages the contained material or the contained material begins to exit tubing 44 at opening 46.

During operation, stop or annular collar 14 is inserted around tubular container 20 as indicated in FIGS. 8 and 9 and slid along its length to the desired location. In some cases, stop 14 will need to be adjacent discharge end 38 of container 20 while in others, stop 14 can be placed intermediate container 20 or even adjacent fill end 48. For example, in the event care must be taken to prevent tubing 44 of nipple 42 from being inserted too far inside the animals' mouth, stop 14 will be placed adjacent discharge end 38. In other cases where such care need not be taken, but where a firm grip on tubular container 20 is required, stop 14 can be placed closer to or even adjacent fill end 48.

Stop 14 can also be placed up against the animals' lips or mouth, thereby preventing the animal from unexpectedly biting or licking more that is permitted. Also, by placing the user's hands behind stop 14, protection from the animals' mouth and/or bodily fluids is provided.

Furthermore, by carefully selecting the length of connector 16 and by positioning stop 14 at certain locations or ranges along tubular container 20, the ability to move plunger 12 with respect to tubular container 20 can be restrained. In other words, should it be desired for plunger 12 to only move a certain distance within container 20, for example half-way, stop 14 and connector 16 can be arranged such that once the half-way point along container 20 is reached, there will be no more slack in connector 16, thereby effectively preventing plunger 12 from proceeding any further. In order for plunger 12 to proceed further, stop 14 will need to be re-positioned along container 20. This feature is possible by securing connector 16 to the brace 28 of working end 18 of plunger 12 rather than opposite hand-held region 22 (the other end of connector 16 being, of course, secured to aperture 94 in stop 14).

Consequently, in the event tubular container 20 contains more than one dose of material to be supplied to an animal, stop 14 can be positioned such that only the proper amount will be forced into the animals' mouth, and no more. Thus, in the event container 20 contains, say, three dosages of fluid or other material to be delivered, stop 14 can be positioned one-third of the way up from discharge end 38. This will supply enough slack to connector 16 such that working end 18 will only be able to move within tubular container 20 one-third of the way. Then, when another dose of material is to be delivered, stop 14 can be moved to a position two-thirds of the distance from discharge end 38. This will supply more slack to connector 16, thereby permitting working end 18 to move one-third closer to discharge end 38 which enables the second dose to be supplied the animal. Finally, in order to deliver the final dose, stop 14 can be positioned adjacent fill end 48, thereby supplying maximum slack to connector 16 which will permit plunger 12 to move all the way towards discharge end 38. Of course, for this feature to operate, the length of connector 16 must be carefully calculated. The outside of tubular container 20 can also be calibrated or marked to assist the user in ascertaining the proper dosage to be supplied by this method.

In the event the user does not desire connector to be so critically calibrated and instead prefers a considerable amount of slack between plunger 12 and stop 14, connector 16 can, in that case, be made any adequate length. In any event, whether connector 16 is carefully calibrated or not, it will still secure plunger 12 to stop 14 and hence to tubular container 20 so that plunger 14 will not become lost or misplaced during the filling operation.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A device for orally feeding or injecting an animal, comprising:

(a) an elongated tubular container having a first open end and an opposite tapered end which tapers to an opening smaller than said first open end;

(b) an elongated plunger having a distal end sized to fit within said first open end and seal against the inside surface of said tubular container, said plunger further comprising a proximate hand-held end for pushing said distal end within said tubular container;

(c) means mountable on and slidable along the outside surface of said tubular container for limiting the distance that said tubular container can be inserted within the animal's mouth and restricting the distance that said plunger can be pushed within said tubular container, said means for limiting comprising an annular collar mountable on and slidable along said tubular container, said collar further shielding the user's hand from contact with the animal's mouth during use; and, (d) means for connecting said means for limiting to said plunger, said means for connecting comprising a cord having one end secured to said annular collar and the opposite end secured adjacent said distal end of said plunger.

2. The device as set forth in claim 1, further comprising discharging means secured to said tapered end of said tubular container for discharging the contents of said tubular container into the animal's mouth.

3. The device as set forth in claim 2, wherein said means are removable from said tubular container.

4. The device as set forth in claim 3, wherein said distal end of said plunger comprises seal means for sealing against the inside surface of said tubular container.

5. The device as set forth in claim 4, wherein said distal end of said plunger is a flat, elongated member.

6. A device for orally feeding or injecting an animal, comprising:

(a) an elongated tubular container having a first open end and an opposite tapered end which tapers to an opening smaller than said first open end;

(b) an elongated plunger having a distal end sized to fit within said first open end and seal against the inside surface of said tubular container, said distal end of said plunger having bracing member mounted adjacent thereto, and, said plunger further comprising a proximate hand-held end for pushing said distal end within said tubular container;

(c) means mountable around and slidable along the outside surface of said tubular container for limiting the distance that said tubular container can be inserted within the animal's mouth and restricting the distance that said plunger can be pushed within said tubular container, said means for limiting comprising an annular collar mounted around and slidable along said tubular container, said collar further shielding the user's hand from contact with the animal's mouth during use; and, (d) means for connecting said means for limiting to said plunger, said means for connecting comprising a cord having one end secured to an aperture in said annular collar and the opposite end secured to an aperture in said bracing member mounted on said distal end of said plunger.

7. The device as set forth in claim 6, further comprising means secured to said tapered end of said tubular container for discharging the contents of said tubular container into the animal's mouth.

8. The device as set forth in claim 7, wherein said discharging means are removable from said tubular container.

9. The device as set forth in claim 8, wherein said distal end of said plunger comprises seal means for sealing against the inside surface of said tubular container.

10. The device as set forth in claim 9, wherein said distal end of said plunger is a flat, elongated member.

11. A device for orally feeding or injecting an animal, comprising:

(a) an elongated tubular container having a first open end and an opposite tapered end which tapers to an opening smaller than said first open end, said tapered end having means thereon for discharging the contents of said tubular container into the animal's mouth;

(b) an elongated generally flat plunger having a circular distal end sized to snugly fit within said first open end and seal against the inside surface of said tubular container, said distal end of said plunger having a bracing member mounted adjacent thereto, and, said plunger further comprising a proximate hand-held end for pushing said distal end within said elongated tubular container, said proximate end of said plunger having bracing means mounted adjacent thereto;

(c) an annular collar mountable around and slidable along the outside surface of said tubular container for limiting the distance that said tubular container can be inserted within the animal's mouth, said means further restricting the distance that said plunger can be pushed within said tubular container; and, (d) means for connecting said collar to said plunger, said means for connecting comprising a cord having one end secured to said annular collar through an aperture in said annular collar and the other end secured to said plunger near said distal end of said plunger through an aperture in said bracing member mounted adjacent the distal end of said plunger.

* * * * *